United States Patent
Tamminga (10) Patent No.: US 6,929,394 B2
(45) Date of Patent: Aug. 16, 2005

(54) DOOR FOR A VERTICAL MIXER (75) Inventor: Jacob R. Tamminga, Orton (CA)

(73) Assignee: Jay-Lor International Inc., Orton (CA)

( * ) Notice: Subject to any disclaimer, the term of this patent is extended or adjusted under 35 U.S.C. 154(b) by 207 days.

(21) Appl. No.: 10/621,339

(22) Filed: Jul. 18, 2003

(65) Prior Publication Data
US 2004/0090860 A1 May 13, 2004

Related U.S. Application Data (60) Provisional application No. 60/396,565, filed on Jul. 18, 2002.

(51) Int. Cl.[7] .............................. B01F 7/24; B01F 15/02
(52) U.S. Cl. ....................... 366/192; 366/196; 366/314; 366/603
(58) Field of Search ................................. 366/192, 196, 366/302, 306, 307, 314, 318, 603, 605, 266, 301, 319, 323; 222/556, 557

(56) References Cited

U.S. PATENT DOCUMENTS

| | | | |
|---|---|---|---|
| 5,143,221 A | * | 9/1992 | Faccia |
| 5,143,449 A | * | 9/1992 | Faccia |
| 5,154,510 A | * | 10/1992 | Faccia |
| 5,429,436 A | * | 7/1995 | Stone |
| 5,456,416 A | * | 10/1995 | Hartwig |
| 5,462,354 A | * | 10/1995 | Neier |
| 5,590,963 A | * | 1/1997 | Schuler |
| 5,810,475 A | * | 9/1998 | St. Ama |
| 5,863,122 A | * | 1/1999 | Tamminga |
| 6,328,465 B1 | * | 12/2001 | Tamminga |
| 6,834,989 B2 | * | 12/2004 | Tamminga |
| 6,863,433 B2 | * | 3/2005 | Knight |
| 2005/0058017 A1 | * | 3/2005 | Van Der Plas |
| 2005/0063249 A1 | * | 3/2005 | Tamminga |

FOREIGN PATENT DOCUMENTS

EP           373503 A1 * 6/1990

* cited by examiner

Primary Examiner—Charles E. Cooley (57) ABSTRACT

A vertical mixer has a mixing chamber with a vertical auger rotatably mounted therein. The mixing chamber has a side wall and a floor. The side wall has an opening therein that includes part of the floor and is closable by a door. The door includes a segment that is part of the floor when the door is in a closed position. The auger is sized and shaped to partially extend through the opening when the door is open during part of each rotation.

11 Claims, 13 Drawing Sheets

DOOR FOR A VERTICAL MIXER

This invention claims priority based on U.S. Provisional Application Ser. No. 60/396,565 filed Jul. 18, 2002 and incorporates all of said provisional application by reference. This invention relates to a door for a vertical mixer, the mixer having a mixing chamber with a vertical auger rotatably mounted therein. More particularly, the mixing chamber has a door and the door includes part of the floor of the mixing chamber when the door is in a closed position.

BACKGROUND OF THE INVENTION

1. Field of the Invention
2. Description of the Prior Art

Vertical feed mixers of various forms are known and, in particular, vertical feed mixers for mixing round bales of hay or haylage of any size, including large and small bales with other animal feed stuffs including corn, silage, commodities, by-products and concentrates are known. Previous vertical feed mixers have a mixing chamber with a vertically mounted auger having a helically shaped expanding periphery that is narrowest at a top and increases in size towards a base. The mixing chamber has a door in a side wall thereof. The door has a closed position and an open position and is used to allow feed that has been mixed to exit the mixer. With previous mixers, when the mixing process has been completed, the door is moved to the open position and a large portion of the feed that has been mixed exits from the mixing chamber through the door. Usually, the mixing chamber is not completely emptied and a sizeable portion of the feed remains within the mixing chamber. The feed must either be removed manually by an operator of the mixer or remains in the mixer where it is ultimately wasted or becomes mixed in with more feed that is subsequently mixed within the mixer. When different types of feed are mixed in different batches, it is not desirable to have a sizeable amount of feed remaining in the mixer as that feed might contaminate a subsequent batch. The feed remaining in the mixer reduces the efficiency of the mixer and makes the mixer much more expensive to operate.

SUMMARY OF THE INVENTION

It is an object of the present invention to provide a vertical mixer having a mixing chamber with a door that is sized and located so that the mixing chamber is substantially emptied of material that is mixed therein when the door is opened to allow the mixed material to exit. It is a further object of the present invention to provide a vertical mixer having an auger in a mixing chamber where the auger extends partially beyond the opening during each rotation of the auger when the door is in an open position.

A vertical mixer has a mixing chamber containing a substantially vertical rotatable auger having a generally helical flight that is tapered to converge from bottom to top. There are power means to rotate the auger about a longitudinal centre axis. The mixing chamber has a floor and a side wall. The side wall has an opening therein that includes part of the floor. The opening is sized and located to be closed by a door, the door having a closed position and an open position. The door has a segment thereon that forms part of the floor when the door is in the closed position. Preferably, the auger is sized and shaped to extend partially out of the opening during part of each rotation of the auger when the door is in the open position.

DETAILED DESCRIPTION OF A PREFERRED EMBODIMENT

Figure 1:
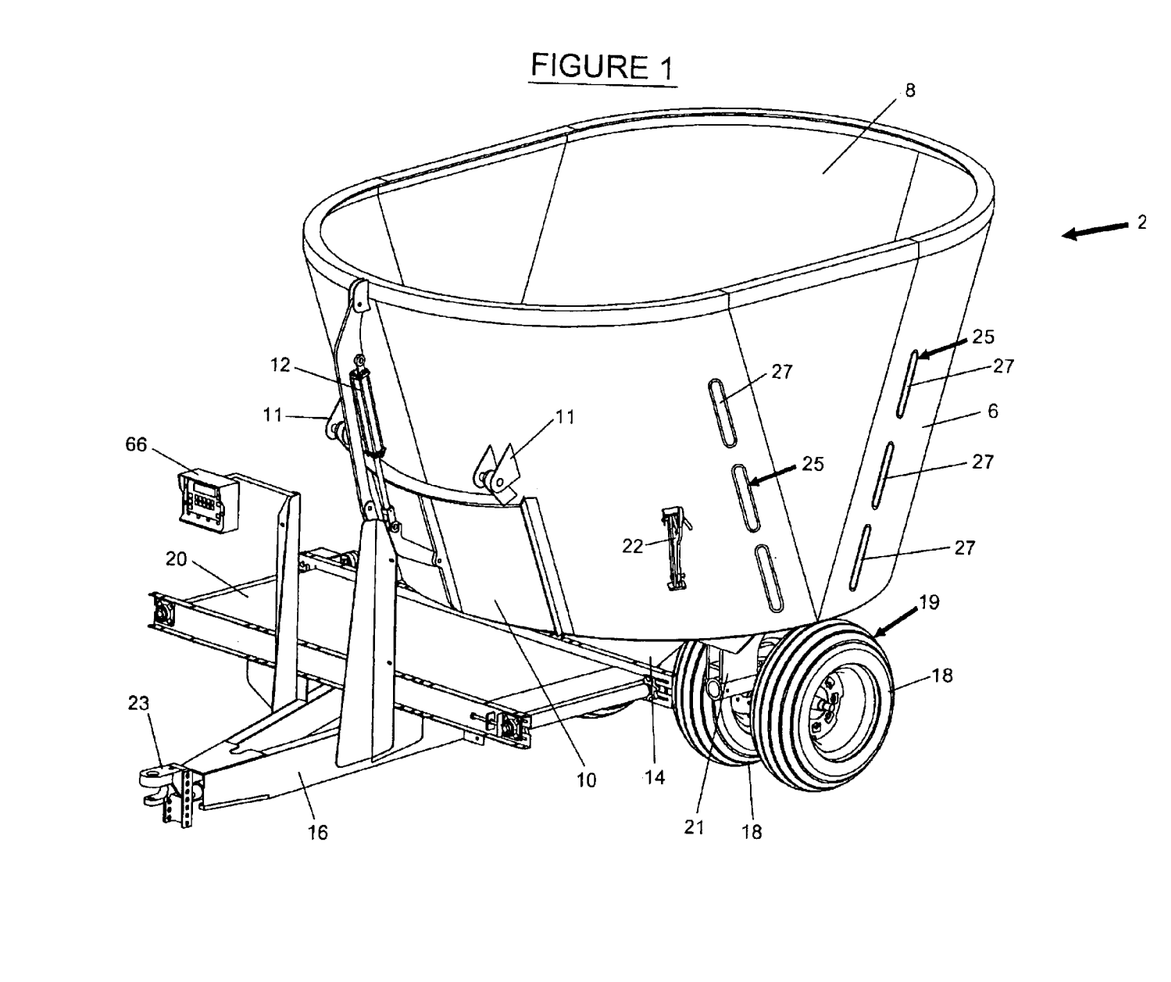
FIG. 1 is a perspective view of a single auger vertical mixer.
Figure 2:
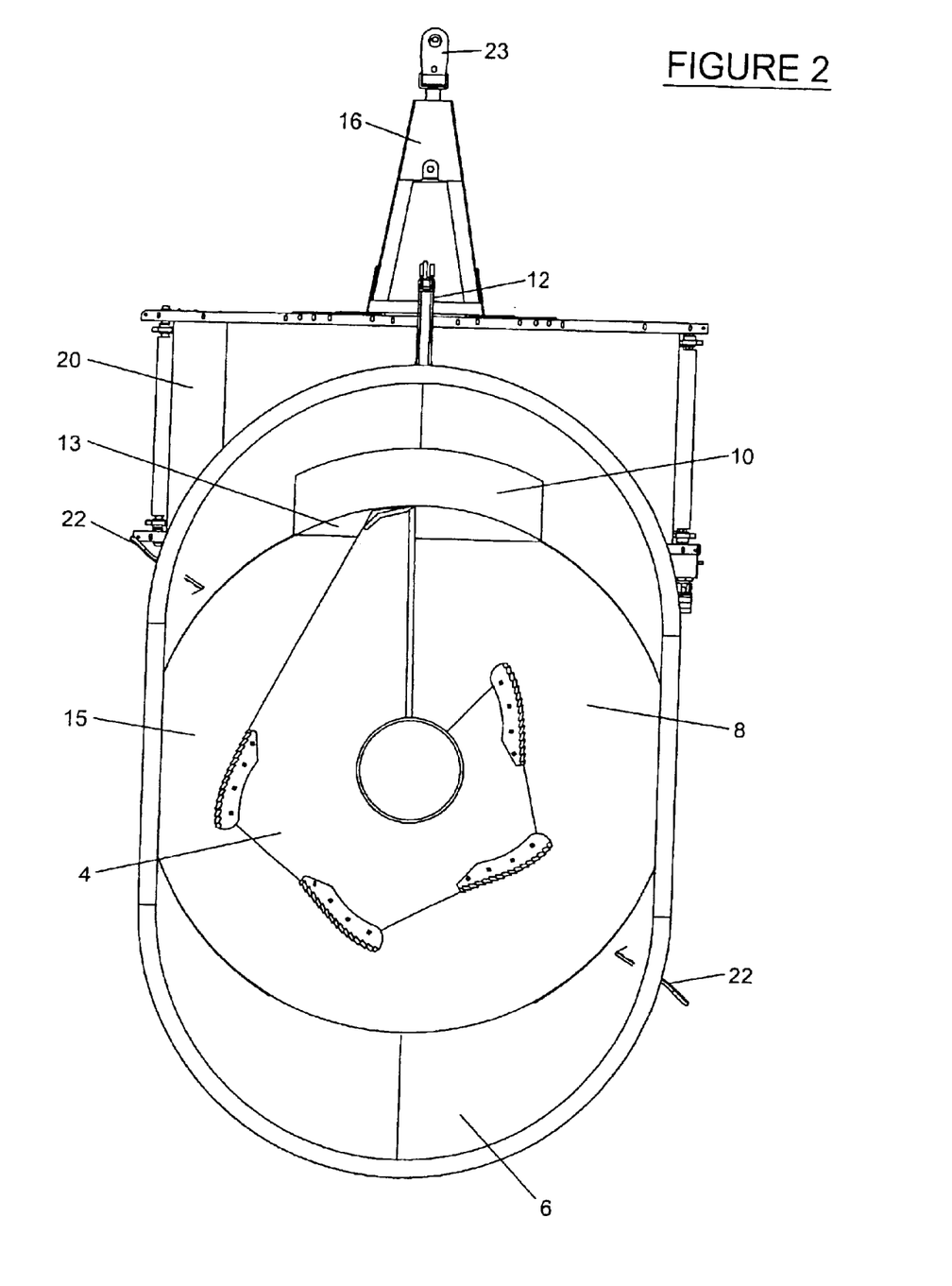
FIG. 2 is a top view of the mixer of FIG. 1.

In FIGS. 1 and 2, there is shown a mixer 2 having a single auger 4 with a tapered wall 6 of a mixing chamber 8. The tapered wall 6 converges from top to bottom. The chamber 8 has an open top and an outlet door 10 that is in a closed position. The door 10 is connected to the mixing chamber by hinges 11 and is operable between a closed position and an open position (not shown) by means of a hydraulic cylinder 12. The door can be designed to be opened and closed in various ways. The door has a segment 13 along a bottom thereof that forms part of a floor 15 of the mixing chamber 8 when the door is in the closed position. The mixer 2 has a frame 14 with a tongue 16 and wheels 18. There are two sets 19 of wheels 18 mounted on each side of the mixer 2 (only one set 19 being shown in FIG. 1) Each set 19 has two wheels 18. Each set 19 is affixed to the mixer by a bracket 21. A conveyer 20 is used to move mixed material that exits the door 10 away from the mixer 2. An adjustable baffle 22 located in the wall 6 assists in controlling the degree of cutting that occurs within the mixer. There are two baffles 22 shown in the mixer 2. The tongue 16 has a hitch 13 to connect the mixer to a tractor (not shown). There are two groups 25 of windows 27 extending between a top and bottom of the tapered wall 6.

Figure 3:
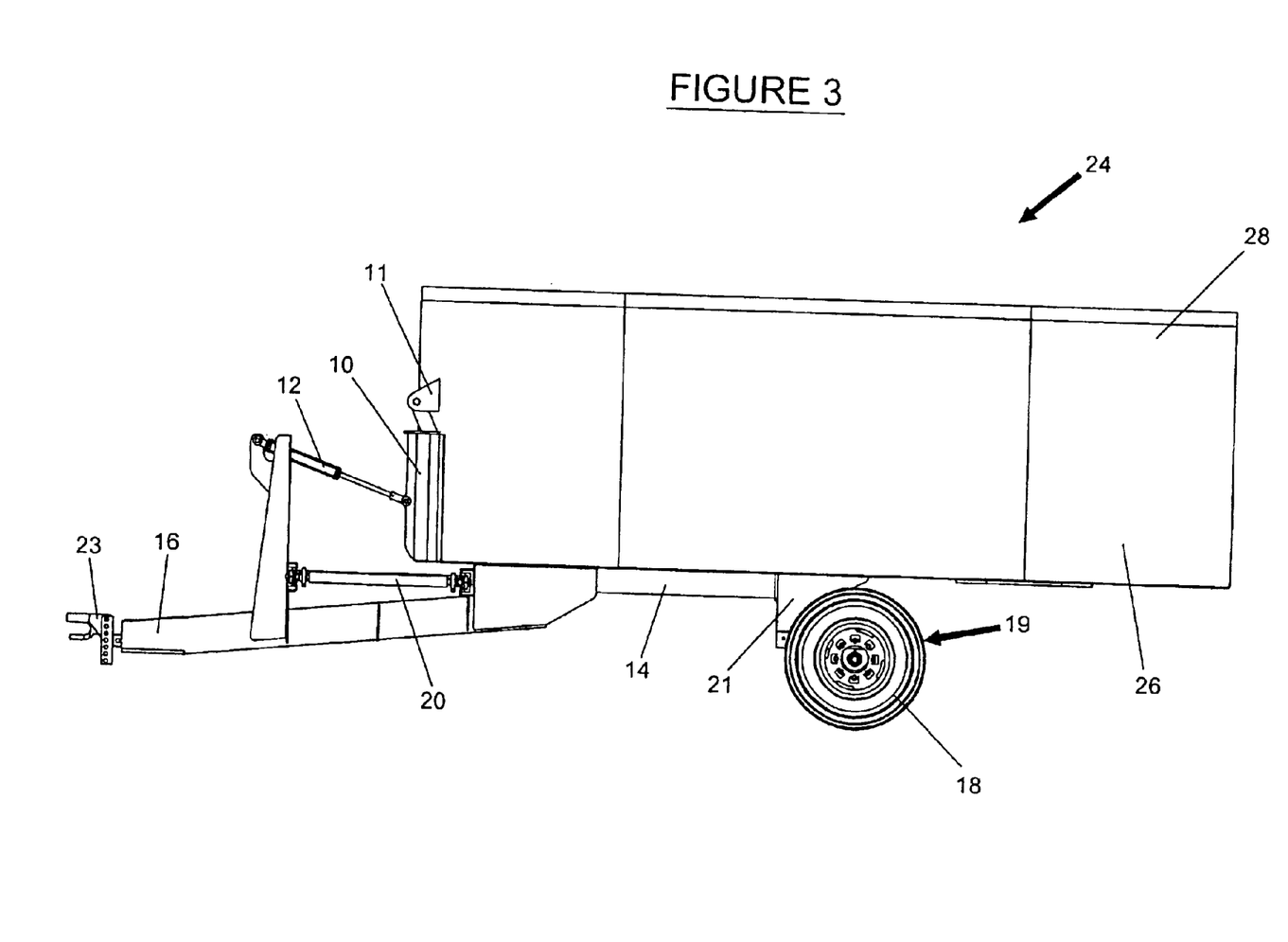
FIG. 3 is a side view of a double auger mixer.
Figure 4:
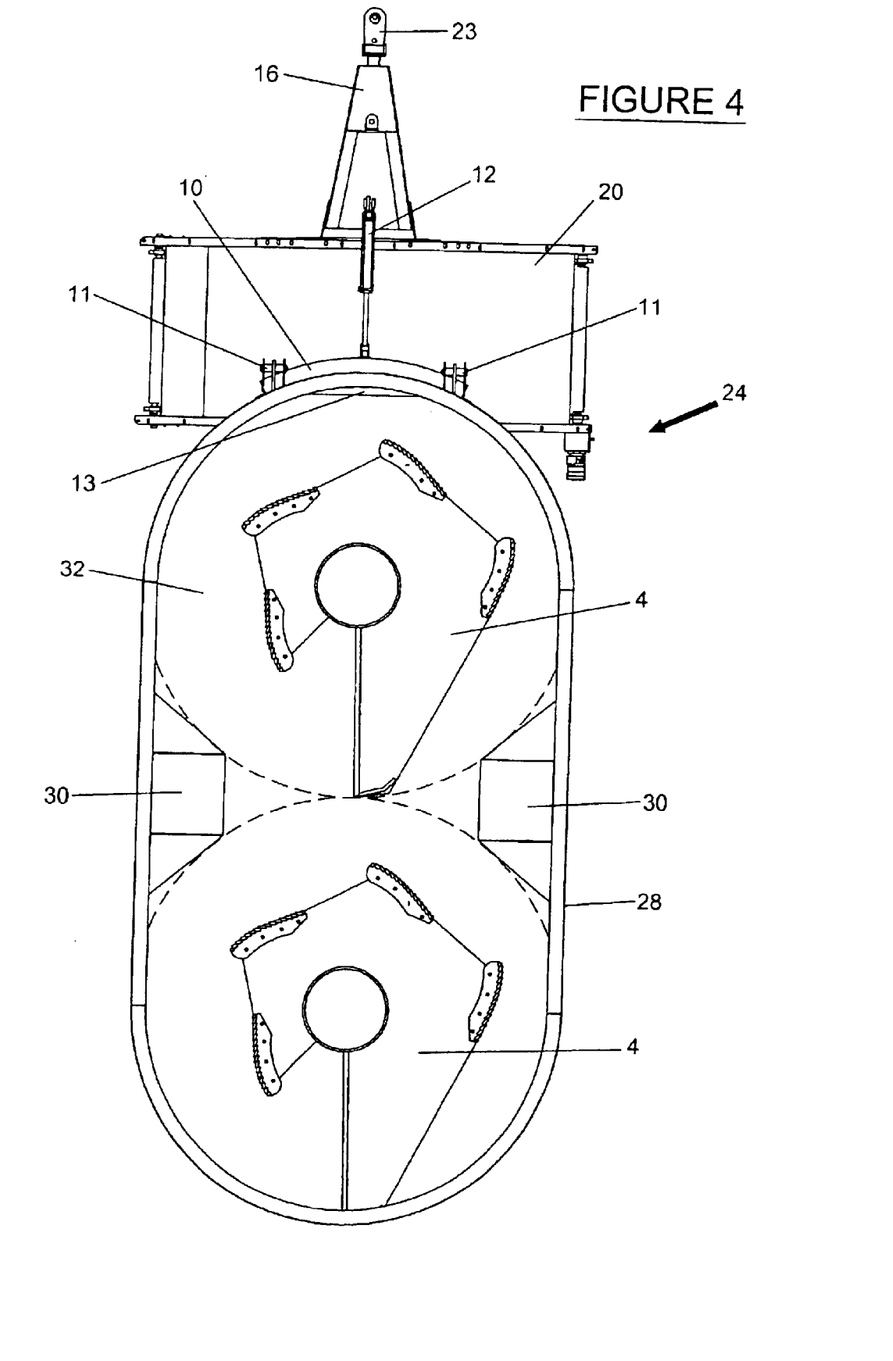
FIG. 4 is a top view of the mixer of FIG. 3.

In FIGS. 3 and 4, a mixer 24 has two augers 4. A side wall 26 of a mixing chamber 28 is vertical. Bulkheads 30 are located within the chamber 28 between the two augers 4. The bulkheads 30 have sloped surfaces and are located in what would otherwise be dead areas of the chamber 28 to prevent materials that are being mixed from coming to rest in the areas where the bulkheads are located. When material strikes the bulkheads 30, the material slides onto a floor 32 of the mixing chamber 28. The mixer 24 has a drive shaft (not shown) that is sized and located to be connected to the power take-off of a tractor (not shown). Those components of FIGS. 3 and 4 that are the same or similar to the components of FIGS. 1 and 2 are described using the same reference numerals as used for FIGS. 1 and 2.

Figure 5:
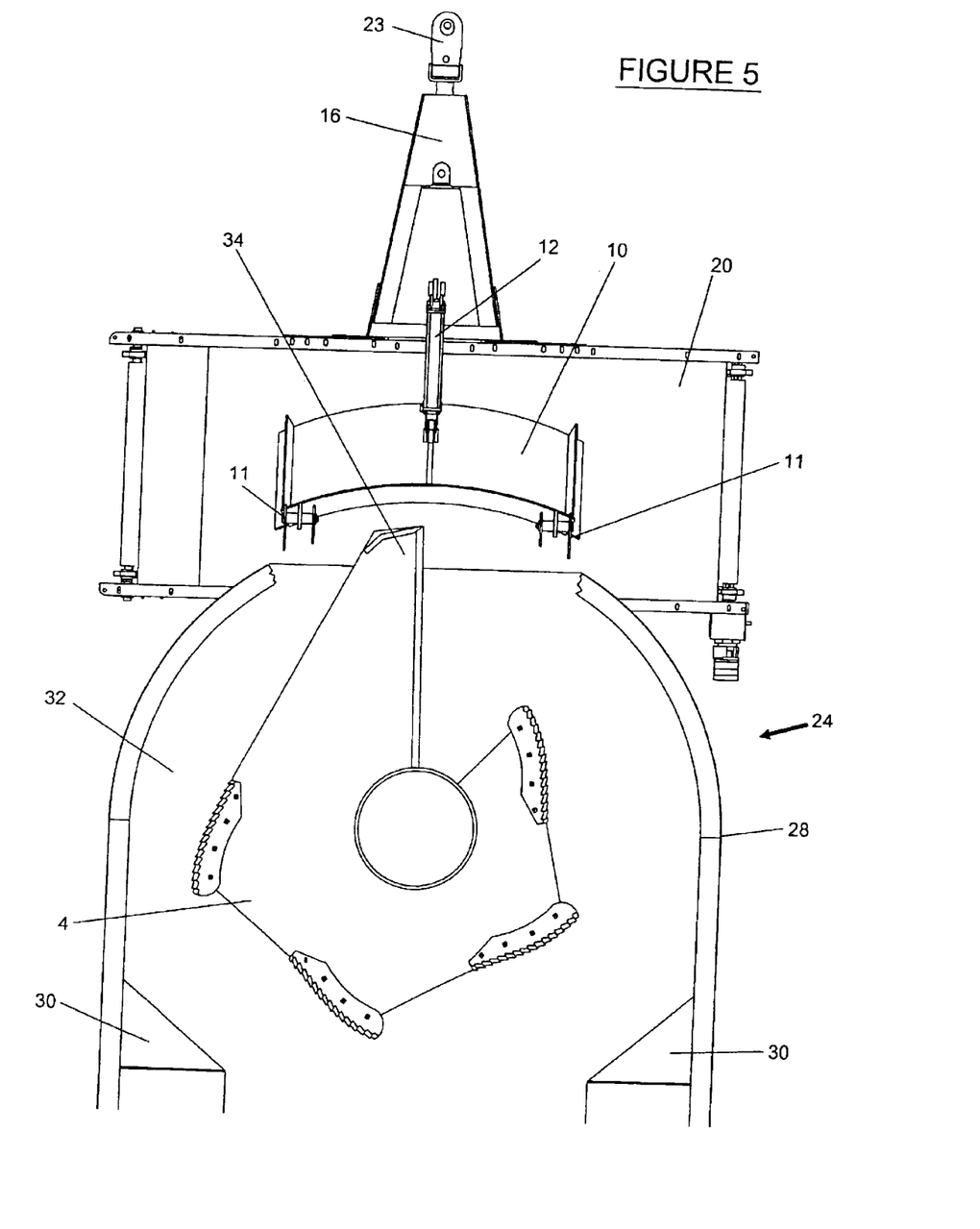
FIG. 5 is a partial top view of the mixer of FIG. 3 where the door is in an open position and a front portion of the mixer is cut away.

FIG. 5 is a partial top view of the mixer 24 with a front portion of the mixing chamber 28 cut away to show a clear view of part 34 of the auger 4 extending out of said opening during part of each rotation of the auger when the door 10 is in an open position. Part 34 is an outer end of a lowermost flight of the auger 4. The same reference numerals are used in FIG. 5 to describe those components that are identical to the components of FIGS. 3 and 4.

Figure 6:
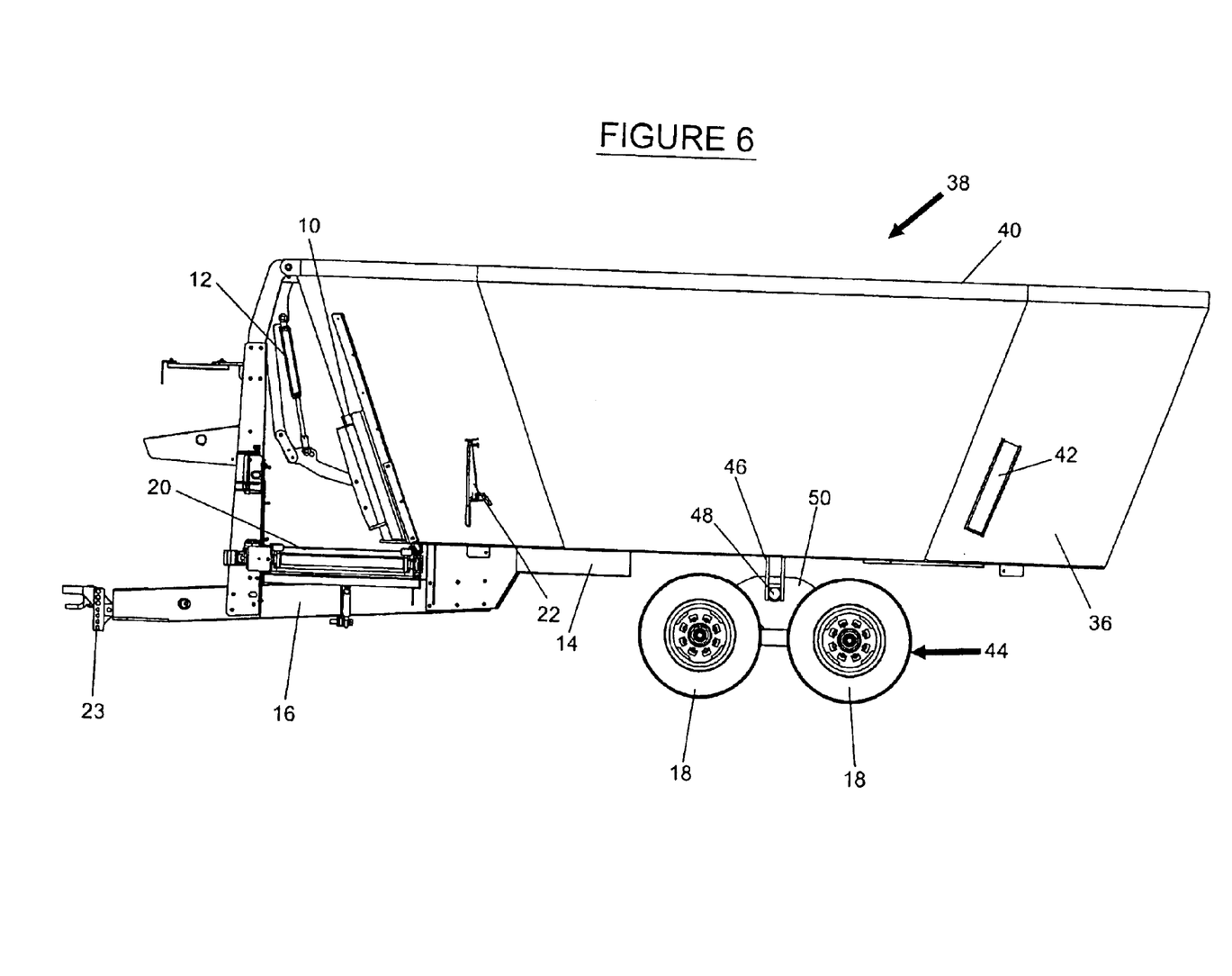
FIG. 6 is a side view of a further embodiment of a mixer with a door in a closed position.

In FIG. 6, there is shown a further embodiment of a vertical mixer where the mixer has sloped sidewalls 36. Those components of FIG. 6 that are the same or similar to components of FIGS. 3 to 5 are described using the same reference numerals. A mixer 38 has a mixing chamber 40 with a door 10 in the closed position. A vertical window 42 is located in the sidewall 36. The mixer 38 has two sets 44 of four wheels 18 in each set, there being one set 44 on either side of the mixer. A bracket 46 is affixed to an underside of the mixing chamber 40. The bracket 46 supports a pivot bar 48. A pivot bracket 50 pivots about the pivot bar 48. Each set 44 of wheels 18 pivots about the pivot bar 48.

Figure 7:
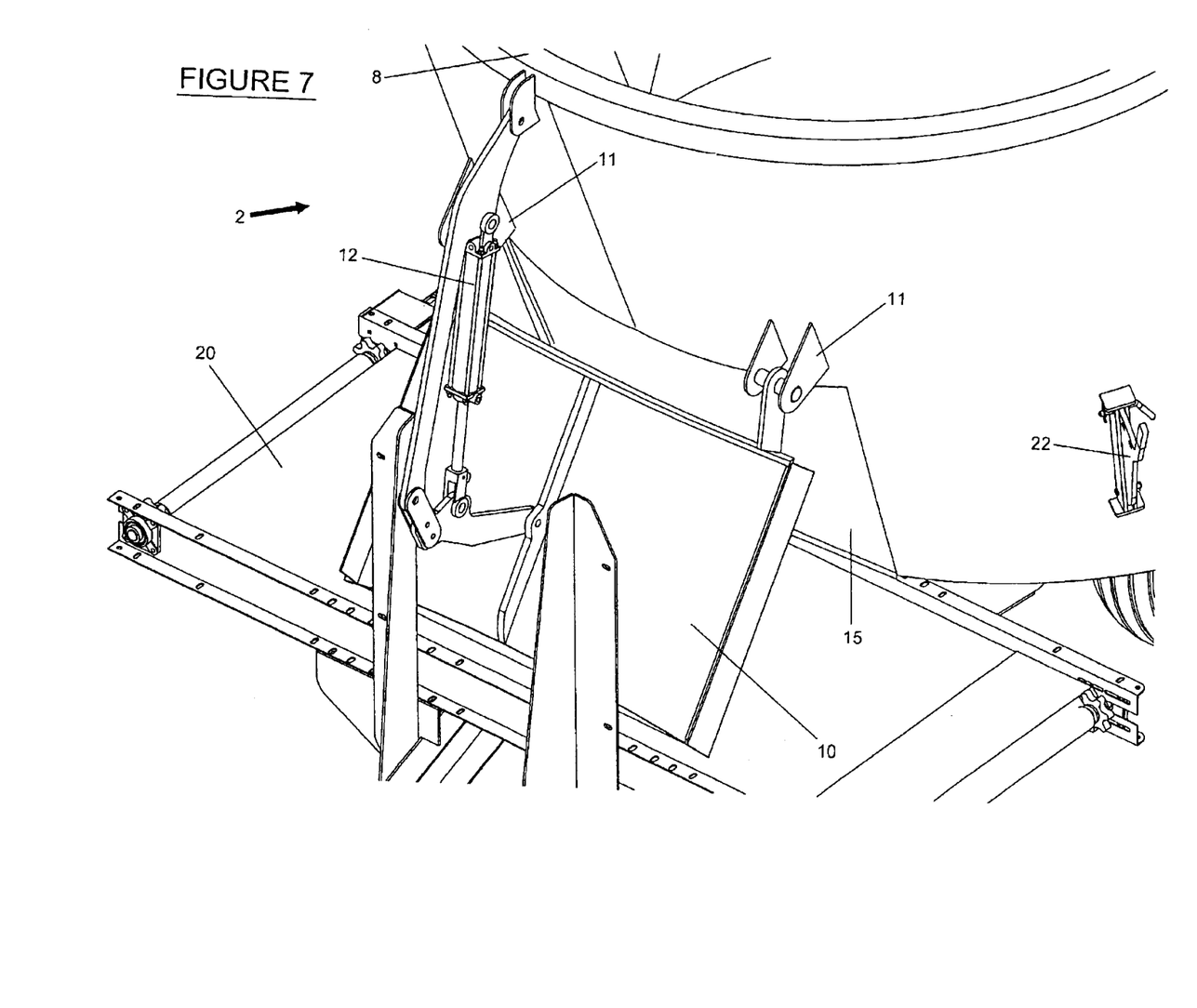
FIG. 7 is an enlarged perspective view of the mixer of FIG. 1 with the door in an open position.
Figure 8:
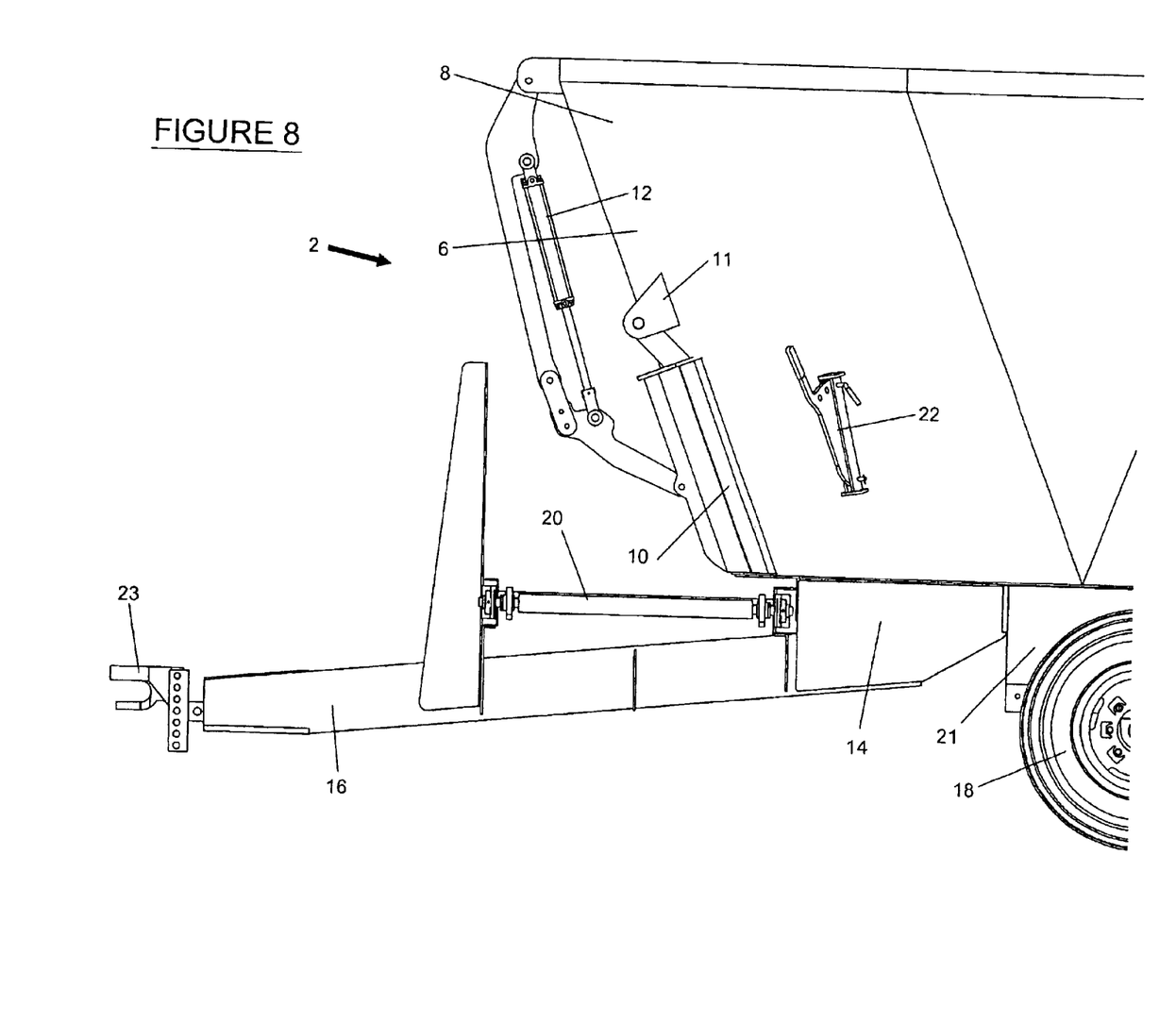
FIG. 8 is a partial side view of the mixer of FIG. 1 with the door in a closed position.
Figure 9:
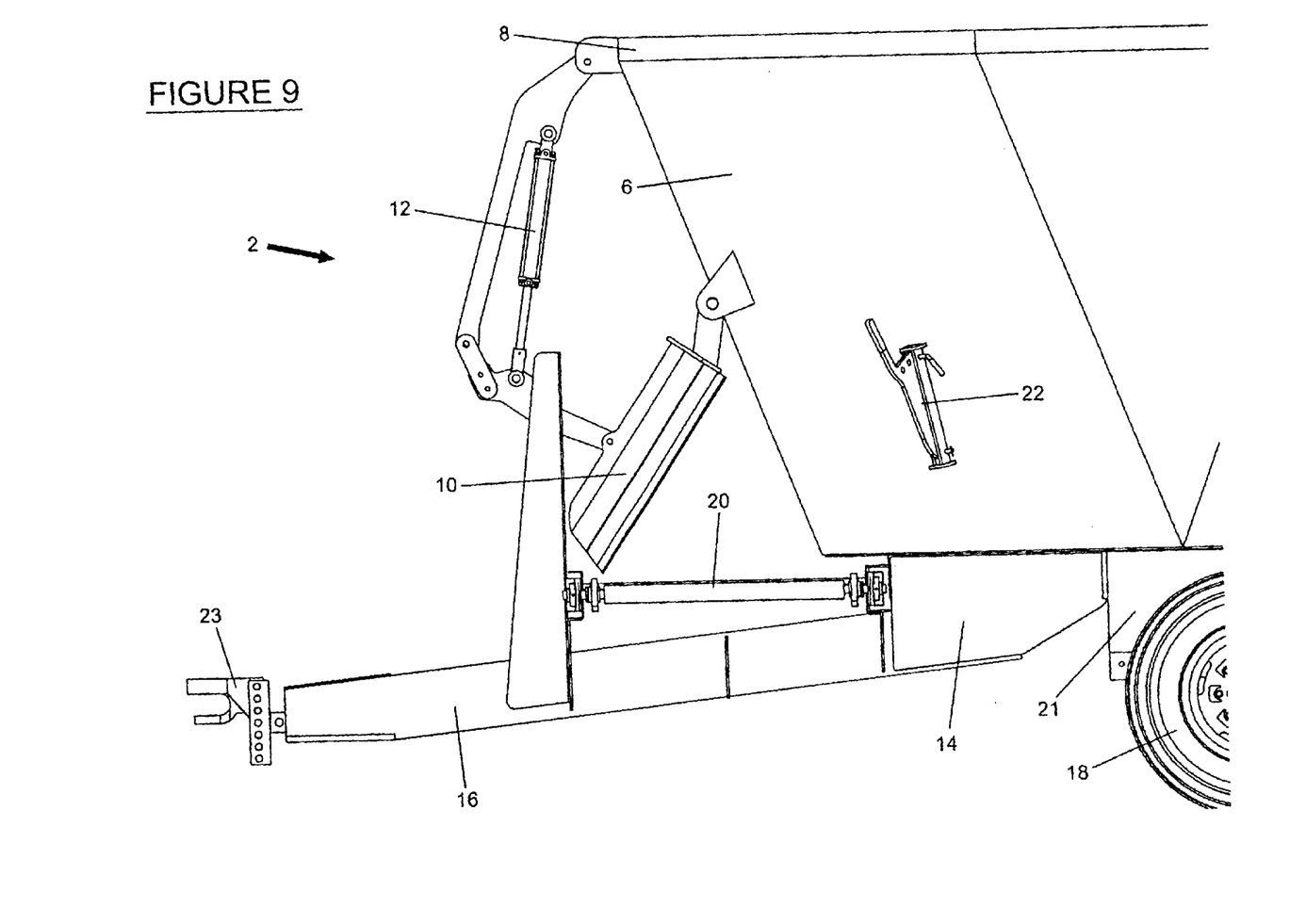
FIG. 9 is a partial side view of the mixer of FIG. 1 with the door in an open position.

In FIG. 7, there is shown a partial enlarged perspective view of the mixer 2 of FIG. 1 with the door 10 in an open position. In FIG. 8, there is shown a partial side view of the mixer 2 of FIG. 1 with the door 10 in an open position. In FIG. 9, there is shown a partial enlarged side view of the mixer 2 of FIG. 1 with the door 10 in a closed position. The same reference numerals are used in FIGS. 7, 8 and 9 as those used in FIGS. 1 and 2 for those components that are identical.

Figure 10:
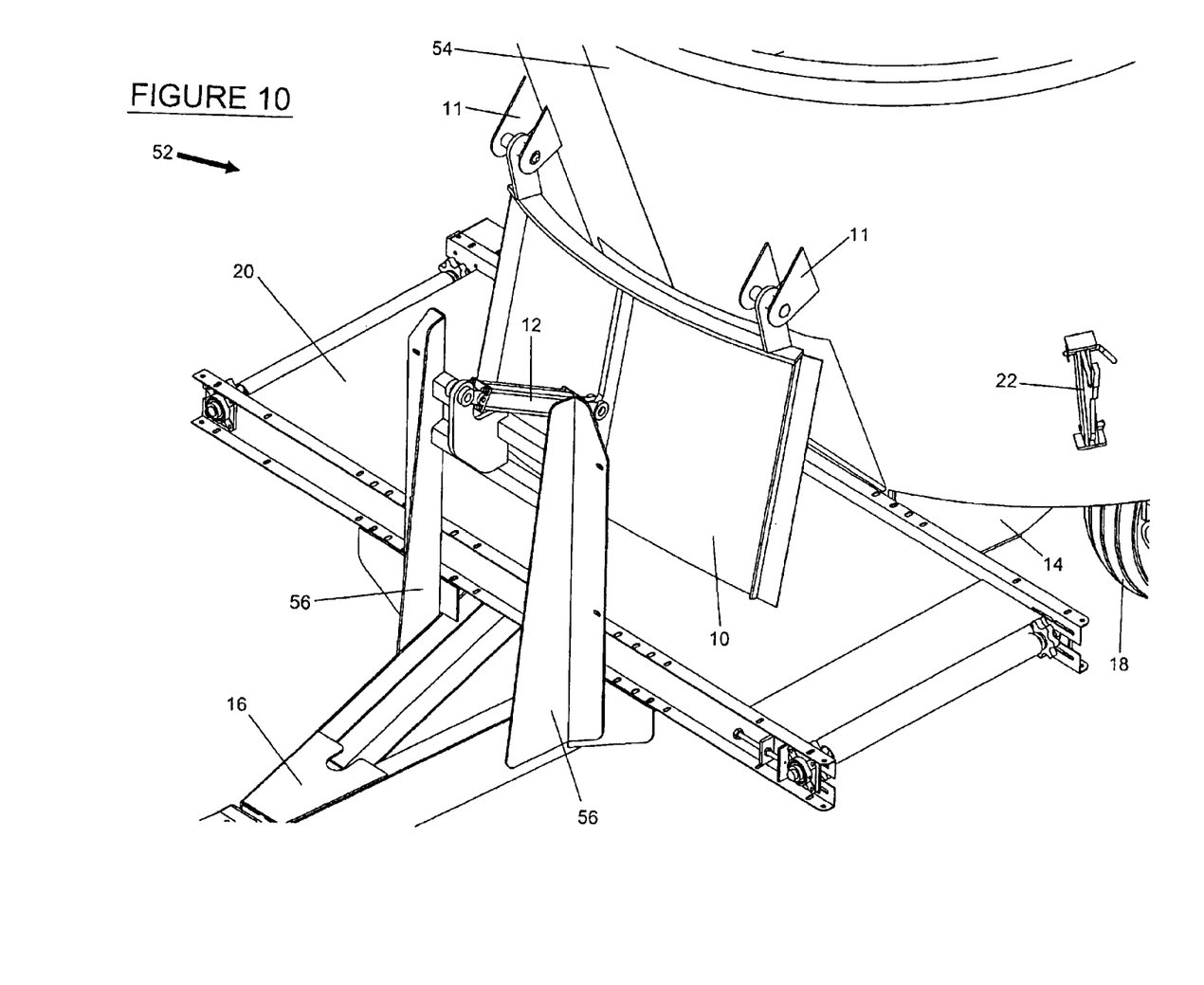
FIG. 10 is a partial perspective view of a further embodiment of a mixer having a door in an open position.

In FIG. 10, there is shown an enlarged partial perspective view of a further embodiment of a mixer 52 having a mixing chamber 54 with a door 10 in an open position. The mixer 52 is virtually identical to the mixer 2 except that the hydraulic cylinder 12 to open and close the door 10 is connected to two vertical posts 56 extending upward from the tongue 16.

Figure 11:
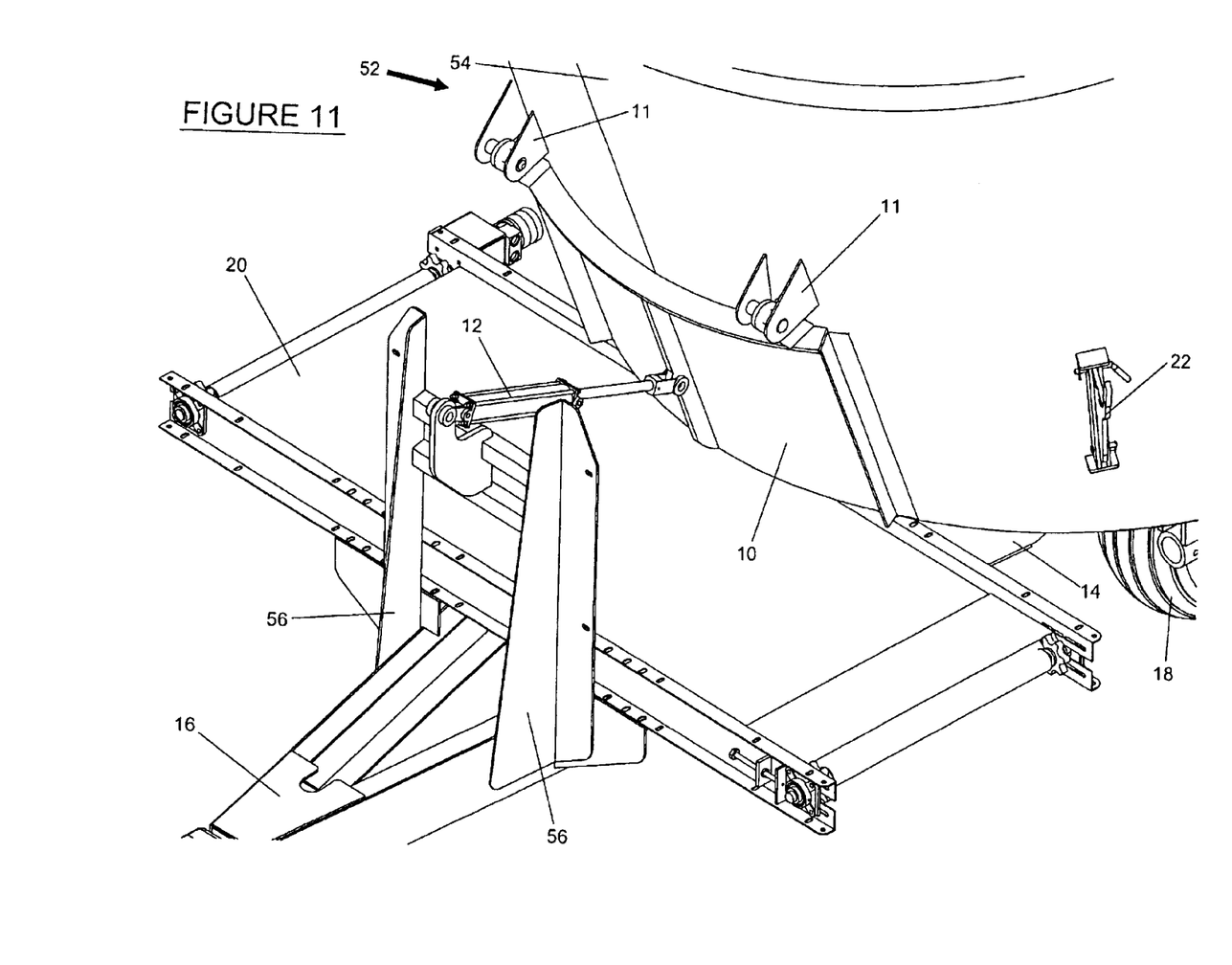
FIG. 11 is a partial perspective view of a mixer with the door in a closed position.

In FIG. 11, there is shown an enlarged partial perspective view of the mixer 52 with the door 10 in a closed position.

Figure 12:
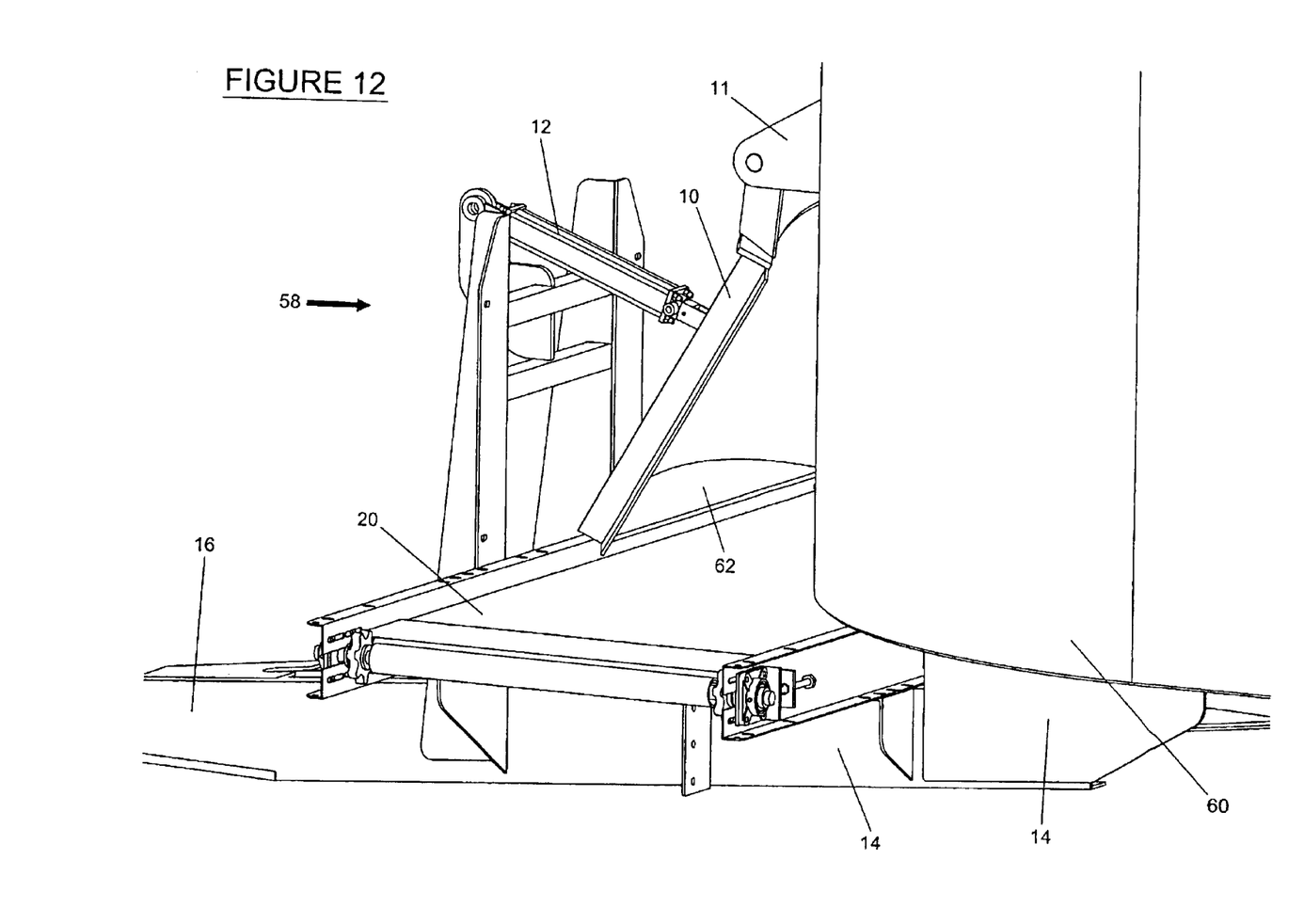
FIG. 12 is a perspective view of an inside of a door.

In FIG. 12, there is shown an enlarged perspective view of a further embodiment of a mixer 58 having a mixing chamber 60 with vertical side walls 62. The door 10 of the mixer 60 opens and closes in exactly the same manner as the door 10 of the mixer 52 shown in FIGS. 10 and 11. An inside view of the door 10 is shown and it can be seen that the door has a segment 62 extending across a bottom thereof.

Figure 13:
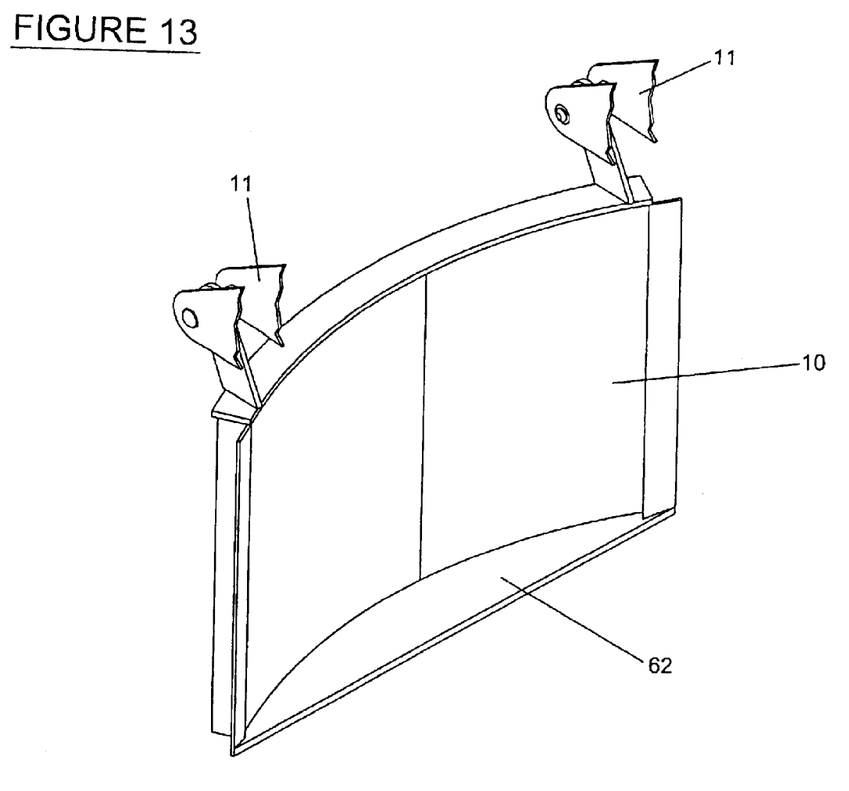
FIG. 13 is a partial perspective view of an inside of a door in an open position.

In FIG. 13, there is shown a perspective view of an interior of the door 10 having the segment 62. When the door is in a closed position, the segment 62 forms part of the floor of the mixing chamber with which the door is used. Preferably, the segment is substantially flush with the floor of the mixing chamber.

With the door of the present invention, the mixing chamber can be substantially emptied of mixed material by briefly rotating the auger while the door is open at the end of the mixing process.

I claim:

1. A vertical mixer comprising a mixing chamber containing a substantially vertical rotatable auger having a generally helical flight that is tapered to converge from bottom to top, with power means to rotate said auger about a longitudinal center axis, said mixing chamber having a floor and a side wall, said side wall having an opening therein that includes part of said floor, said opening being sized and located to be closed by a door, said door having a closed position and an open position.

2. A vertical mixer as claimed in claim 1 wherein said door has a segment thereon that forms part of said floor when said door is in said closed position.

3. A vertical mixer as claimed in claim 2 wherein said auger is sized and shaped to extend partially out of said opening during part of each rotation of said auger when said door is in said open position.

4. A vertical mixer as claimed in any one of claim 2 or 3 wherein said segment has an upper surface that is substantially flush with an upper surface of said floor when said door is in a closed position.

5. A vertical mixer as claimed in any one of claim 1, 2 or 3 wherein there is at least one hinge extending between said door and said side wall, said door pivoting on said at least one hinge when moving between said open position and said closed position.

6. A vertical mixer as claimed in any one of claim 1, 2 or 3 wherein there is a hydraulic cylinder connected to open and close said door.

7. A vertical mixer as claimed in any one of claim 1, 2 or 3 wherein there are two hinges extending between said door and said side wall, said hinges being located at a top of said door.

8. A vertical mixer as claimed in any one of claim 1, 2 or 3 wherein said door has two hinges.

9. A vertical mixer as claimed in any one of claim 2 or 3 wherein said segment is located at a bottom of said door.

10. A vertical mixer as claimed in any one of claim 1, 2 or 3 wherein said flight has a periphery with a plurality of substantially straight sections.

11. A vertical mixer as claimed in any one of claim 1, 2 or 3 wherein said side wall has at least one window therein extending at least partially between a top and bottom of said side wall to allow visual access to an interior of said chamber from outside said mixer.

* * * * *